US009442947B2

United States Patent
Kwak et al.

(10) Patent No.: US 9,442,947 B2
(45) Date of Patent: Sep. 13, 2016

(54) METHOD AND DEVICE TO SEARCH FOR AND EXECUTE CONTENT USING A TOUCH SCREEN

(71) Applicant: Samsung Electronics Co., Ltd., Suwon-si (KR)

(72) Inventors: Ji Yeon Kwak, Seoul (KR); Hyun Jin Kim, Gwangju (KR); Min Kyu Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/643,975

(22) Filed: Mar. 10, 2015

(65) Prior Publication Data

US 2015/0186400 A1   Jul. 2, 2015

Related U.S. Application Data

(63) Continuation of application No. 12/535,267, filed on Aug. 4, 2009, now Pat. No. 9,007,311.

(30) Foreign Application Priority Data

Sep. 9, 2008   (KR) ........................ 10-2008-0088560

(51) Int. Cl.
   *G06F 3/041*   (2006.01)
   *G06F 17/30*   (2006.01)
   (Continued)

(52) U.S. Cl.
   CPC ....... *G06F 17/30126* (2013.01); *G06F 3/0482* (2013.01); *G06F 3/0488* (2013.01); *G06F 3/04817* (2013.01); *G06F 17/30601* (2013.01); *G06F 17/30997* (2013.01)

(58) Field of Classification Search
   CPC ...... G06F 3/041; G06F 3/045; G06F 3/0481; G06F 3/0488; G06F 3/0486
   USPC ......... 345/173, 174; 715/764, 846, 862, 863
   See application file for complete search history.

(56) References Cited

U.S. PATENT DOCUMENTS

| 7,149,904 | B2 | 12/2006 | Kubo |
| 7,895,532 | B2 | 2/2011 | Scott et al. |

(Continued)

FOREIGN PATENT DOCUMENTS

| CN | 1445679 | 10/2003 |
| CN | 1445697 | 10/2003 |

(Continued)

OTHER PUBLICATIONS

Chinese Office Action dated Jul. 20, 2012, in Chinese Patent Application No. 200910168922.2.

(Continued)

*Primary Examiner* — Pegeman Karimi
(74) *Attorney, Agent, or Firm* — H.C. Park & Associates, PLC

(57) ABSTRACT

A method and device to search for and execute content are provided. The method of searching for and executing content includes displaying at least one content icon, and identifying, if an approach to one of the at least one content icon is detected, a content icon of a position at which the approach is detected. The method further comprises determining a classification category of a content corresponding to the identified content icon, searching for at least one related content classified in the same classification category as the content corresponding to the identified content icon, displaying the identified content icon and at least one related content icon corresponding to the at least one related content using a preset display method, and executing, if one of the at least one content icon is touched, a content corresponding to the touched content icon.

14 Claims, 11 Drawing Sheets

(51) Int. Cl.
*G06F 3/0488* (2013.01)
*G06F 3/0481* (2013.01)
*G06F 3/0482* (2013.01)

(56) References Cited

U.S. PATENT DOCUMENTS

| | | | |
|---|---|---|---|
| 2003/0018622 A1 | 1/2003 | Chau | |
| 2003/0177113 A1 | 9/2003 | Wakita | |
| 2004/0095395 A1 | 5/2004 | Kurtenbach | |
| 2004/0212617 A1* | 10/2004 | Fitzmaurice | G06F 3/0481 345/440 |
| 2004/0217947 A1* | 11/2004 | Fitzmaurice | G06F 3/0481 345/183 |
| 2006/0095343 A1* | 5/2006 | Clarke | G06Q 30/0207 705/14.1 |
| 2006/0161871 A1 | 7/2006 | Hotelling et al. | |
| 2007/0192749 A1* | 8/2007 | Baudisch | G06F 3/0486 715/863 |
| 2008/0055263 A1 | 3/2008 | Lemay et al. | |
| 2008/0068456 A1 | 3/2008 | Fujii et al. | |
| 2008/0098331 A1 | 4/2008 | Novick et al. | |
| 2008/0165141 A1* | 7/2008 | Christie | G06F 3/044 345/173 |
| 2009/0058829 A1* | 3/2009 | Kim | G06F 3/0416 345/173 |
| 2009/0128498 A1 | 5/2009 | Hollemans et al. | |
| 2009/0150775 A1 | 6/2009 | Miyazaki et al. | |
| 2009/0172571 A1 | 7/2009 | Vasilache et al. | |
| 2009/0265670 A1 | 10/2009 | Kim et al. | |

FOREIGN PATENT DOCUMENTS

| | | |
|---|---|---|
| CN | 1589553 | 3/2005 |
| CN | 101079784 | 11/2007 |
| CN | 101146178 | 3/2008 |
| JP | 2006-031499 | 2/2006 |
| JP | 2006-120184 | 5/2006 |
| JP | 2006-293996 | 10/2006 |
| KR | 10-2007-00336077 | 4/2007 |
| KR | 10-2007-0119946 | 12/2007 |
| WO | 2008/030778 | 3/2008 |
| WO | 2008033777 | 3/2008 |

OTHER PUBLICATIONS

European Search Report dated Nov. 27, 2009, in European Patent Application No. 09167531.4-2201.
Non-Final Office Action issued on Apr. 3, 2012, in U.S. Appl. No. 12/535,267.
Final Office Action issued on Oct. 4, 2012, in U.S. Appl. No. 12/535,267.
Non-Final Office Action issued on Jun. 28, 2013, in U.S. Appl. No. 12/535,267.
Final Office Action issued on Mar. 7, 2014, in U.S. Appl. No. 12/535,267.
Non-Final Office Action issued on May 12, 2014, in U.S. Appl. No. 12/535,267.
Notice of Allowance issued on Aug. 21, 2014, in U.S. Appl. No. 12/535,267.
Notice of Allowance issued on Dec. 10, 2014, in U.S. Appl. No. 12/535,267.
Decision of Reexamination dated Jun. 8, 2015 in Chinese Application No. 200910168922.2.
European Search Report dated Jun. 8, 2016, corresponding to European Patent Application No. 09167531.4.
Chinese Office Action issued on May 31, 2016 in Chinese Patent Application No. 201410047749.1.

* cited by examiner

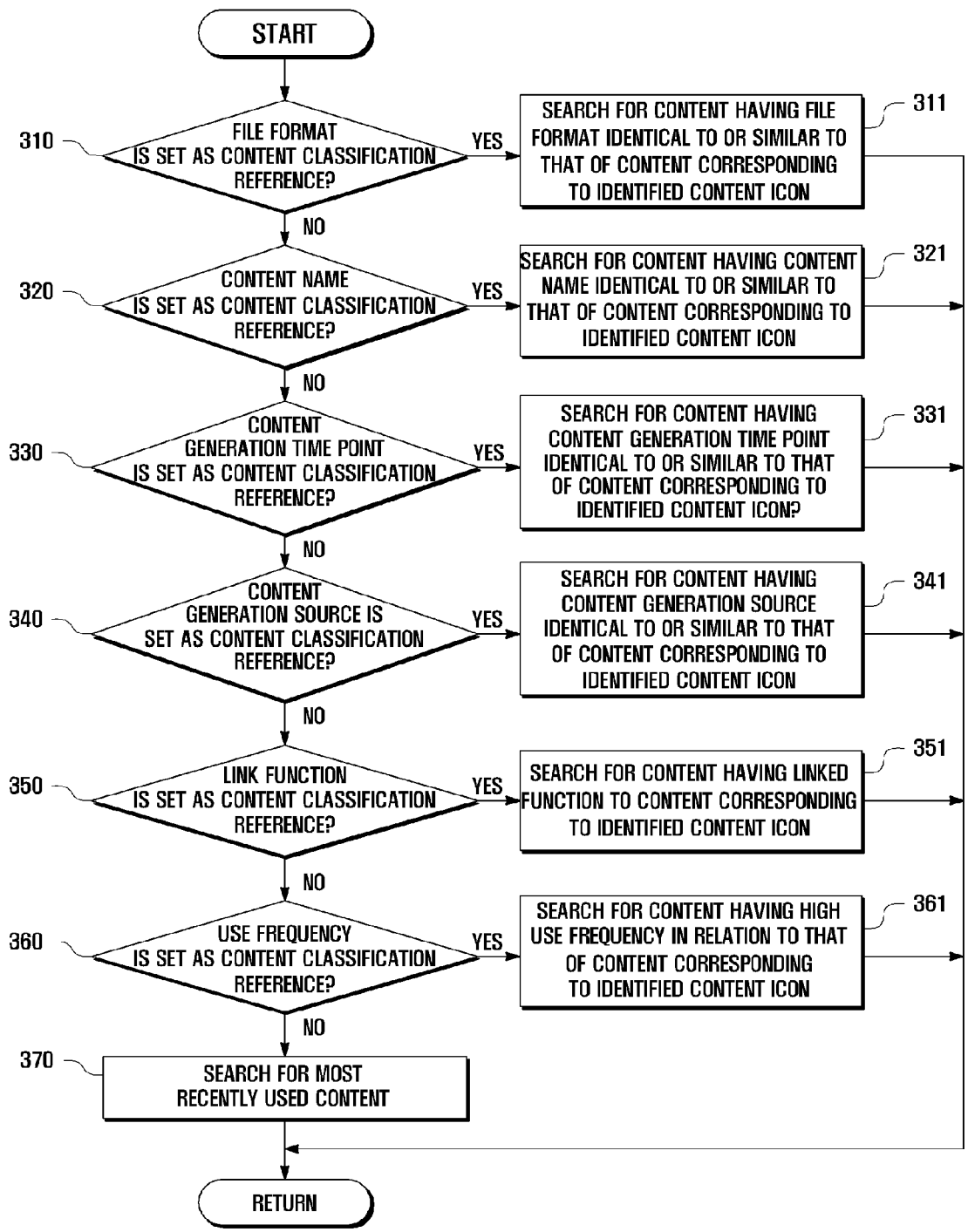

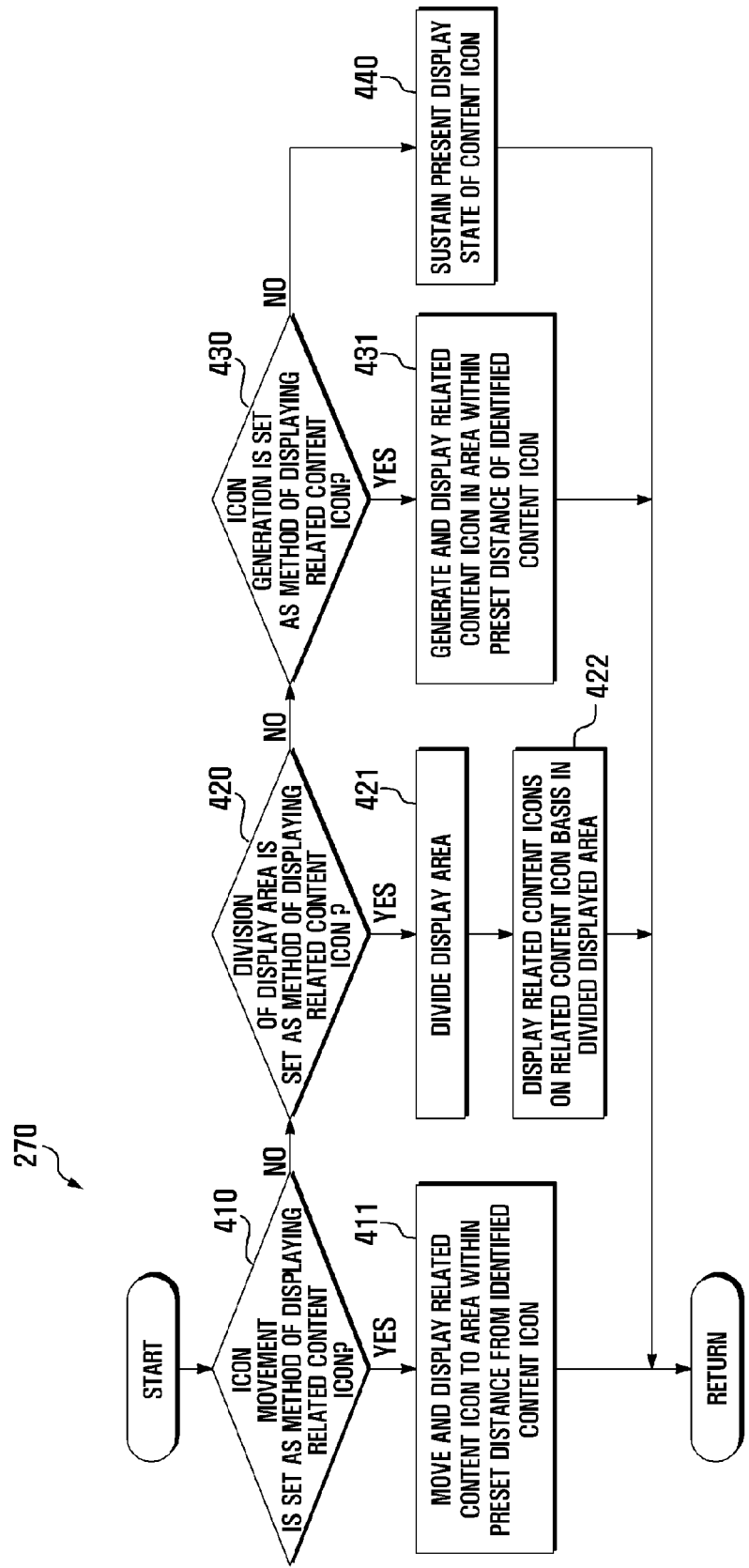

METHOD AND DEVICE TO SEARCH FOR AND EXECUTE CONTENT USING A TOUCH SCREEN

CROSS REFERENCE TO RELATED APPLICATION

This application is a continuation of U.S. patent application Ser. No. 12/535,267, filed on Aug. 4, 2009, and claims priority from and the benefit of Korean Patent Application No. 10-2008-0088560, filed on Sep. 9, 2008, which are both hereby incorporated by reference for all purposes as if fully set forth herein.

BACKGROUND OF THE INVENTION

1. Field of the Invention

Exemplary embodiments of the present invention relate to a method and device configured to search for and execute content using a touch screen.

2. Description of the Background

Devices having a touch screen are widely used. When a user directly contacts a touch screen using a finger or a pen type touch device, the touch screen display device recognizes the portion of the touch screen in which the contact occurs, to execute an instruction corresponding to the portion, or to move a position of a cursor. Because touch screens do not require space for a separate input unit, touch screens may be appropriate for a small terminal and may be widely used in mobile devices.

As touch screen technology develops, touch user interface technology is becoming diversified. Current touch user interface technologies include a touch screen method in which a tactile sensor detects a distribution of a pressing force, a vibration feedback method to notify a user touching a touch screen that the touch is recognized by performing a vibration, and a multi-touch method to enlarge or reduce a display screen by recognizing touches of more than one finger.

A method to search for contents more simply together with the noted technologies above, and a user interface related to the method has been developed. To search for and execute a specific content stored within devices having a touch screen, a user may have to repeat a touch action several times and search through a content list. Although several technologies have been developed in relation to a simple method of searching for and executing content, when using a conventional touch screen, a limitation exists in reducing the quantity of touch actions.

Further, when developing a recommendation function of recommending and displaying content for a user to use, a limitation exists when using a conventional touch screen method.

SUMMARY OF THE INVENTION

Exemplary embodiments of the present invention provide a method of simply searching for and executing content thereby reducing the quantity of touch actions.

Exemplary embodiments of the present invention also provide a device having a touch screen for simply searching for and executing content thereby reducing the quantity of touch actions.

Additional features of the invention will be set forth in the description which follows, and in part will be apparent from the description, or may be learned by practice of the invention.

Exemplary embodiments of the present invention disclose a method comprising displaying at least one content icon, and identifying, if an approach to one of the at least one content icon is detected, a content icon at a position at which the approach is detected. The method further comprises determining a classification category of content corresponding to the identified content icon, and searching for at least one related content classified in the same classification category as the content corresponding to the identified content icon. The method further comprises displaying, using a display method, the identified content icon and at least one related content icon corresponding to the at least one related content, and executing, if one of the at least one content icons is touched, content corresponding to the touched content icon.

Exemplary embodiments of the present invention disclose a device comprising an approach detection unit, a touch detection unit, a display unit, a storage unit, and a controller. The approach detection unit detects an approach of a touch device. The touch detection unit detects a touch of the touch device. The display unit displays at least one content icon and content corresponding thereto. The storage unit stores the at least one content icon and content corresponding thereto. The controller identifies, when an approach detection signal is received from the approach detection unit, a content icon at a position at which the approach is detected. The controller determines a classification category of content corresponding to the identified content icon, and searches in the storage unit, for at least one related content classified in the same category as the content corresponding to the identified content icon. The controller displays, using a display method, the identified content icon and at least one related content icon corresponding to the at least one related content in the display unit, and executes, if a touch detection signal is received from the touch detection unit, a content corresponding to the touched content icon.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 3 is a flowchart illustrating a process of searching for a related content according to a content classification reference in the method of FIG. 2 according to exemplary embodiments of the present invention.

FIG. 4 is a flowchart illustrating a process of displaying a found related content icon in the method of FIG. 2 according to exemplary embodiments of the present invention.

DETAILED DESCRIPTION OF THE ILLUSTRATED EMBODIMENTS

Figure 1:
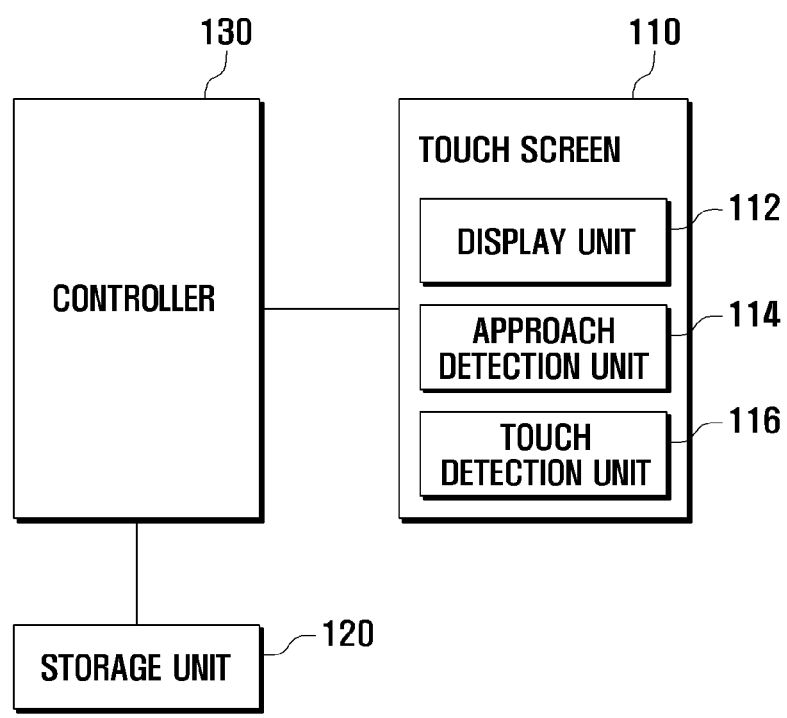
FIG. 1 is a block diagram illustrating a configuration of a device having a touch screen to search for and execute content according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Prior to explaining exemplary embodiments of the present invention, relevant terminology will be defined for the description below.

'Contents' may refer to various programs or information provided from an on-line or off-line source. Contents may indicate entire data stored within a device. For example, content may include a picture file, music file, moving picture file, document file, and various other application programs.

A 'content icon' may refer to an image displayed on a screen having a function of distinguishing particular content. The content icon may be classified and displayed according to an attribute of the content. For example, content having different attributes, such as music content and picture content, may be displayed with different content icon forms. Further, contents having the same attribute may be displayed with different content icons according to a classification reference. For example, two picture contents having different file extensions may be displayed with different content icons. The content icon may guide execution of the content, and a user may execute the content by touching a corresponding content icon.

A 'file format' may refer to a classification reference that indicates a configuration in which a content file is stored. Content may be stored with a specific file format. For example, in a drawing content, a file format thereof may be classified as a 'JPEG image,' 'bit map image,' or 'GIF image.' In a music content, a file format thereof may be classified into an 'MP3 file' or 'Windows Media audio file.' In a document file, a file format thereof may be classified into a 'Jungum Global document file,' 'Hangul document file,' or 'Microsoft Word document file.' In addition, an 'Adobe Acrobat file' and 'application programs' may be included in a file format.

A 'content generation time point' may refer to a classification reference that indicates a time point at which content is generated and stored. For example, in a picture content, 'a content generation time point' may indicate a time point at which a picture is taken and stored.

A 'content generation source' may refer to a classification reference of a generator of content or a content generating device. For example, the content generation source of picture content may be a camera device that takes a picture. Further, the content generation source of music content may be a composer and/or an album title of music content.

A 'content having a link function' may refer to a classification reference of a content having a link function that is to be performed when the specified content is executed. For example, a content having a link function referring to a person may include a communication function content, message transmission and reception content, e-mail transmission and reception content, picture content, and homepage connection content of that person.

Hereinafter, exemplary embodiments of the present invention are described in detail with reference to the accompanying drawings.

FIG. 1 is a block diagram illustrating a configuration of a device having a touch screen to search for and execute content according to exemplary embodiments of the present invention.

A device 100 to search for and execute content according to exemplary embodiments may have a touch screen, and may be, for example, a mobile communication terminal, a mobile terminal (e.g., PDA), a computer, or a TV. The device 100 may include a touch screen 110, a storage unit 120, and a controller 130.

The touch screen 110 may include a display unit 112, an approach detection unit 114, and a touch detection unit 116.

The display unit 112 may be formed with a liquid crystal display (LCD) and may display various display data and operating states generated in the device 100 on the touch screen 110. The display unit 112 may display a content icon, and may display content-related information when content is executed.

The approach detection unit 114 may detect a touch device approaching the touch screen 110. When a touch device approaching the touch screen 110 moves within a preset distance from the touch screen 110, the approach detection unit 114 may detect the presence of the touch device. The approach detection unit 114 may include a capacitance touch detection sensor or an approach sensor. However, the approach detection unit 114 may not be limited thereto and may include any sensor for detecting an approach of an object. When the approach detection unit 114 detects an approach to the touch screen 110 of a touch device, the approach detection unit 114 may transmit an approach detection signal to the controller 130. The approach detection signal may include information about the approach position (i.e., position information in a horizontal plane and position information in a vertical plane) of the touch device.

The touch detection unit 116 may detect a touch of a touch device on the touch screen 110. The touch detection unit 116 may be formed with a capacitance touch detection sensor or a pressure sensor. However, the touch detection unit 116 may not be limited thereto and may include any sensor for detecting a touch of a touch device. When the touch detection unit 116 detects a touch of a touch device on the touch screen 110, the touch detection unit 116 may transmit a touch detection signal to the controller 130. The touch detection signal may include information about the touch position (i.e., position information in a horizontal plane) of the touch device.

The storage unit 120 may store entire contents including program and content icons. Further, the storage unit 120 may store a classification reference for classifying content corresponding to a content icon at a position at which an approach is detected and for classifying related contents included in the same category as that of the content.

The controller 130 may control general operations of the device 100 and may control the display, in the display unit 112, of contents and content icons stored in the storage unit 120. Further, when the controller 130 receives an approach detection signal from the approach detection unit 114, the controller 130 may identify a content icon at an approach position of the touch device, may search for at least one related content in the same category as that of content corresponding to the identified content icon, and may display a content icon of the at least one related content in the display unit 112. Further, when a touch detection signal is received from the touch detection unit 116, the controller 130 may execute the content corresponding to a touched content icon.

Figure 2:
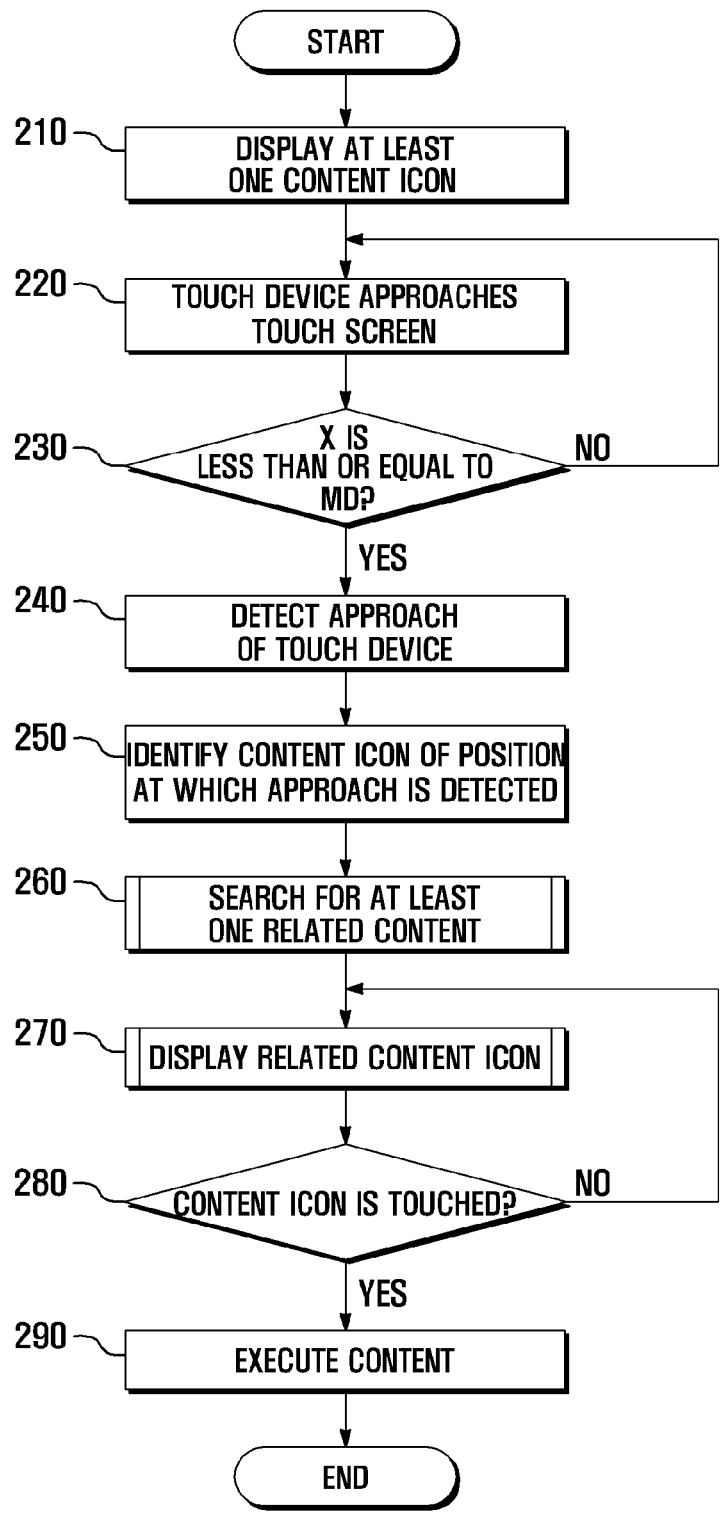
FIG. 2 is a flowchart illustrating a method of searching for and executing content using a touch screen according to exemplary embodiments of the present invention.

FIG. 2 is a flowchart illustrating a method of searching for and executing content using a touch screen according to exemplary embodiments of the present invention.

Referring to FIG. 2, the controller 130 may instruct the display unit 112 to display at least one content icon (210).

When a content icon is displayed, a touch device may approach the touch screen 110 (220). The touch device may be a user's finger or a separate touch instrument such as a touch pen. The approach action to the touch screen 110 of the touch device may be performed until the touch device moves within a preset distance in a vertical direction from the touch screen 110. The preset distance may be a distance from the touch screen 110 within which the approach detection unit 114 can detect an approach, and can be changed according to a detection distance of the approach detection unit 114 or a user's setting.

If the perpendicular distance from the touch screen 110 to a position of a touch device is 'X' and the maximum detection distance at which the approach detection unit 114 can detect an approach is 'MD,' the approach detection unit 114 may detect an approach of the touch device when 'X' is less than or equal to 'MD' (230).

If 'X' is less than or equal to 'MD,' the approach detection unit 114 may detect an approach of the touch device and may transmit an approach detection signal to the controller 130 (240). If 'X' is greater than 'MD,' the process may return to step 220.

When the controller 130 receives the approach detection signal from the approach detection unit 114, the controller 130 may identify a content icon at a position at which the approach is detected (250). The content icon at the position at which the approach is detected may be a content icon positioned within a preset distance from a position of the touch device. The approach detection unit 114 may identify any content icon positioned within a preset distance from the position of the touch device.

The controller 130 may search in the storage unit 120 for at least one related content classified in the same category as that of the content corresponding to the identified content icon by a preset classification reference (260).

The controller 130 may instruct the display unit 112 to display a content icon of the related content (270).

FIG. 3 is a flowchart illustrating a process of searching for a related content according to a content classification reference of step 260 in the method of FIG. 2, according to exemplary embodiments of the present invention.

The content classification reference is not limited to the classification references described in relation to FIG. 3 and can be changed by user setting.

Referring to FIG. 3, the controller 130 may determine whether a 'file format' is set as a content classification reference of the identified content (310). If a 'file format' is set as a content classification reference of the identified content, the controller 130 may search the storage unit 120 for content having a file format identical to or similar to that of the content corresponding to the identified content icon (311).

If a 'file format' is not set as a content classification reference of the identified content, the controller 130 may determine whether a 'content name' is set as a content classification reference of the identified content (320).

If a 'content name' is set as a content classification reference of the identified content, the controller 130 may search the storage unit 120 for content having a content name identical to or similar to that of the content corresponding to the identified content icon (321).

If a 'content name' is not set as a content classification reference of the identified content, the controller 130 may determine whether a 'content generation time point' is set as a content classification reference of the identified content (330).

If a 'content generation time point' is set as a content classification reference of the identified content, the controller 130 may search the storage unit 120 for content having a content generation time point identical to or similar to that of the content corresponding to the identified content icon (331).

If a 'content generation time point' is not set as a content classification reference of the identified content, the controller 130 may determine whether a 'content generation source' is set as a content classification reference of the identified content (340).

If a 'content generation source' is set as a content classification reference of the identified content, the controller 130 may search the storage unit 120 for content having a content generation source identical to or similar to that of the content corresponding to the identified content icon (341).

If a 'content generation source' is not set as a content classification reference of the identified content, the controller 130 may determine whether a 'link function' is set as a content classification reference of the identified content (350).

If a 'link function' is set as a content classification reference of the identified content, the controller 130 may search the storage unit 120 for content having a 'linked function' to the content corresponding to the identified content icon (351).

If a 'link function' is not set as a content classification reference of the identified content, the controller 130 may determine whether a 'use frequency' is set as a content classification reference of the identified content (360).

If a 'use frequency' is set as a content classification reference of the identified content, the controller 130 may search the storage unit 120 for content having a high use frequency in relation to a use frequency of the content corresponding to the identified content icon (361).

If a 'use frequency' is not set as a content classification reference of the identified content, the controller 130 may search the storage unit 120 for a most recently used content (370).

Further, when the content corresponding to the identified content icon is a picture content, a content icon classification reference can be set so that a related content icon of the identified content icon corresponds to, for example, content including an image of the same person in the content corresponding to the identified content icon, content including the same location image as that of the content corresponding to the identified content icon, and/or content generated by the same photographing means as that of the content corresponding to the identified content icon.

When a related content is found, the process returns to FIG. 2 and the controller 130 instructs the display unit 112 to display a related content icon corresponding to the found related content in the display unit 112 (270).

FIG. 4 is a flowchart illustrating a process of displaying a found related content icon of step 270 in the method of FIG. 2.

The display process of step 270 may not be limited to the process shown in FIG. 4 and can be changed by user setting.

Referring to FIG. 4, the controller 130 may determine whether 'icon movement' is set as a method of displaying a related content icon (410).

If 'icon movement' is set as a method of displaying a related content icon, the controller 130 may instruct the display unit 112 to move and display a presently displayed related content icon to an area within a preset distance from the identified content icon (411). The identified content icon may remain in a fixed state in its present position, and related content icons thereof may move to a periphery of the identified content icon. To easily identify a related content icon, sizes of the identified content icon and the related content icons after the movement process can be adjusted by user setting.

If 'icon movement' is not set as a method of displaying a related content icon, the controller 130 may determine whether 'division of a display area' is set as a method of displaying a related content icon (420).

If 'division of a display area' is set as a method of displaying a related content icon, the controller 130 may divide a display area in which content icons are to be displayed (421).

After the display area is divided, the controller 130 may instruct the display area 112 to display related content icons in one of the divided display areas (422). A display area in which the identified content icon and related content icons thereof are to be positioned may be divided. A display area used other than for displaying the identified content icon and related content icons thereof may also be divided to display content icons other than the identified content icon and related content icons.

If 'division of a display area' is not set as a method of displaying a related content icon, the controller 130 may determine whether 'icon generation' is set as a method of displaying a related content icon (430).

If 'icon generation' is set as a method of displaying a related content icon, the controller 130 may generate and display a related content icon that is not presently displayed in an area within a preset distance of the identified content icon (431). The related content icons may be distributed and displayed radially around the identified content icon or may be displayed in various manners by user setting.

If 'icon generation' is not set as a method of displaying a related content icon, the controller 130 may sustain a present display state of the content icon (440).

Returning to FIG. 2, the touch detection unit 116 may determine whether one of the displayed content icons is touched (280).

If one of the displayed content icons is touched, the touch detection unit 116 may detect the touch and transmit a touch detection signal to the controller 130. If none of the displayed content icons is touched, the controller 130 may sustain the content icon display state.

When the controller 130 receives the touch detection signal from the touch detection unit 116, the controller 130 may execute content corresponding to the touched content icon (290).

Figure 5A:
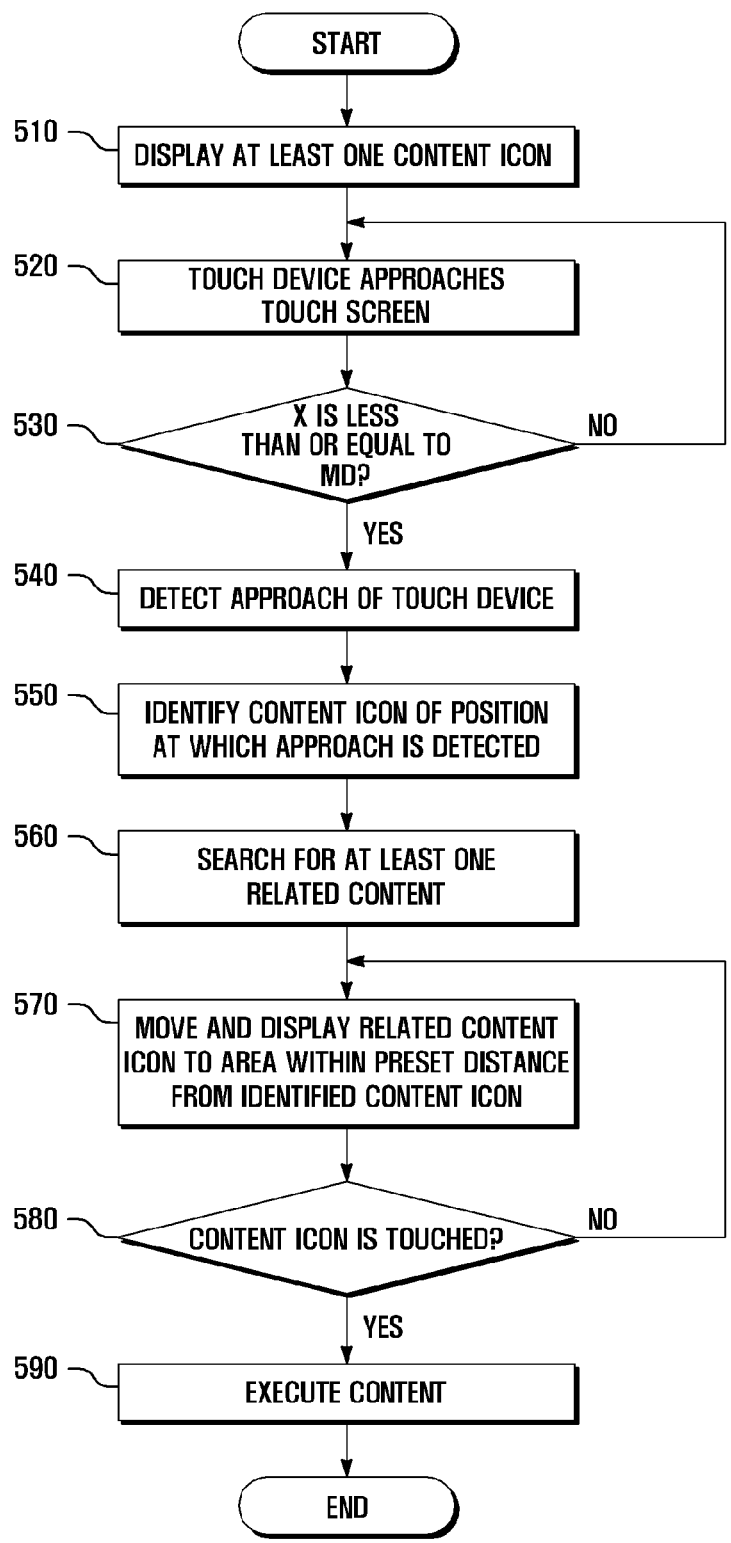
FIG. 5A is a flowchart illustrating an example of the method of searching for and executing content of FIG. 2 according to exemplary embodiments of the present invention.
Figure 5B:
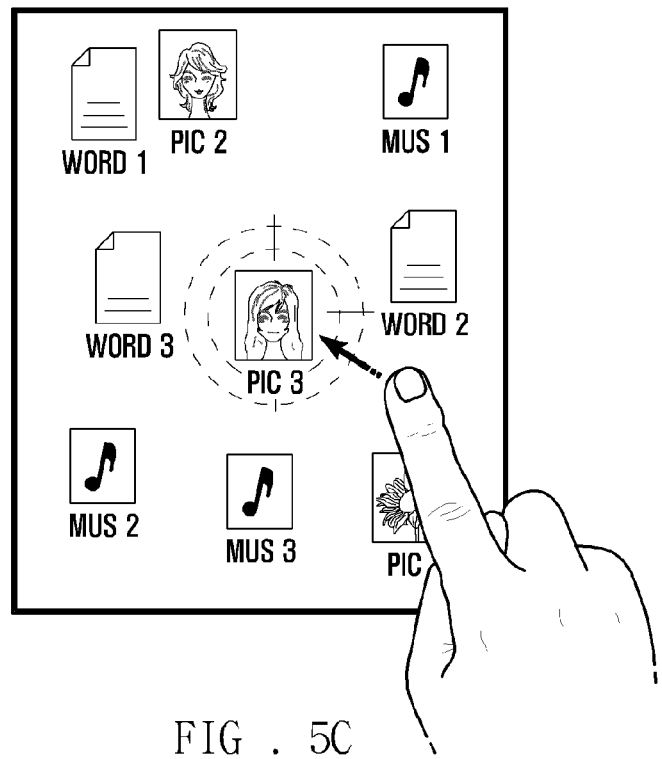
FIG. 5B and FIG. 5C illustrate display screens according to the example of FIG. 5A, according to exemplary embodiments of the present invention.
Figure 5C:
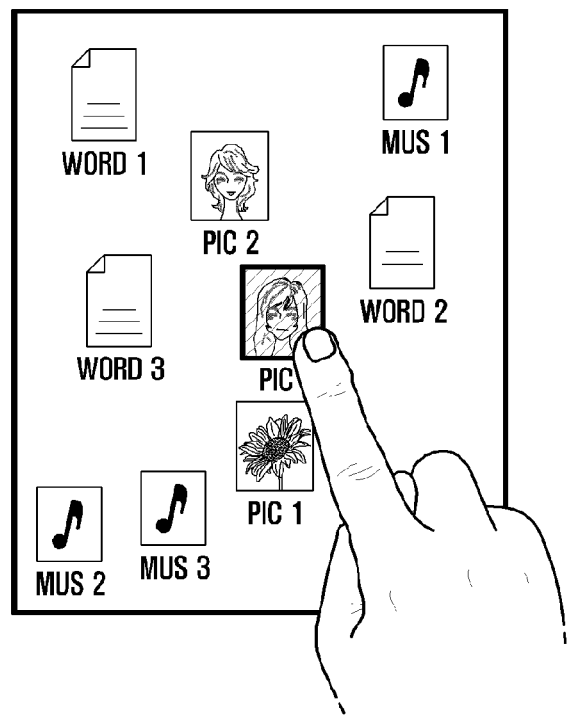

FIG. 5A is a flowchart illustrating an example of the method to search for and execute a content of FIG. 2. FIG. 5B and FIG. 5C illustrate a display screen to search for and execute a content according to the example of FIG. 5A.

Referring to FIG. 5A, the controller 130 may instruct the display unit 112 to display at least one content icon (510). The display screen shown in FIG. 5B corresponds to a background screen or a standby screen of the device 100 having the touch screen 110. FIG. 5B illustrates 9 content icons, wherein 'PIC 1,' 'PIC 2,' and 'PIC 3' are picture content icons, 'MUS 1,' 'MUS 2,' and 'MUS 3' are music content icons, and 'WORD 1,' 'WORD 2,' and 'WORD 3' are document content icons.

A user may perform an approach action to the touch screen 110 with a touch device (520). The approach action to the touch screen 110 may be performed until the touch device moves within a preset distance in a vertical direction from the touch screen 110.

If the perpendicular distance from the touch screen 110 to a touch device is 'X' and the maximum distance at which the approach detection unit 114 can detect an approach is 'MD,' the approach detection unit 114 may detect an approach of the touch device when 'X' is less than or equal to 'MD' (530).

If 'X' is less than or equal to 'MD,' the approach detection unit 114 may detect an approach of the touch device to the touch screen 110 and may transmit an approach detection signal to the controller 130 (540). If 'X' is greater than 'MD,' the process may return to step 520.

When the controller 130 receives the approach detection signal from the approach detection unit 114, the controller 130 may identify a content icon at a position at which the approach is detected (550). The content icon at the position at which the approach is detected may be a content icon positioned within a preset distance of a position of the touch device. The preset distance may be changed by user setting. In FIG. 5B, the content icon of the position at which the approach is detected may be the picture content icon 'PIC 3'.

The controller 130 may search the storage unit 120 for at least one related content in the same category as that of content corresponding to the identified content icon according to a preset classification reference (560). The classification reference may be set so that related content corresponds to content having a file format identical to or similar to that of the content corresponding to the identified content icon. The controller 130 may identify the approached content icon 'PIC 3' and may search the storage unit 120 for related content classified in the same category as that of the content corresponding to 'PIC 3.' For example, the controller 130 may search for content having the same file format as that of 'PIC 3.' 'PIC 3' is a picture content and may have a file format such as a 'JPEG image,' 'bit map image,' or 'GIF image.' The controller 130 may search for contents having a file format identical to or similar to that of 'PIC 3', for example, contents corresponding to picture content icons 'PIC 1' and 'PIC 2.'

The file formats of the contents corresponding to 'PIC1,' 'PIC 2,' and 'PIC 3' may be identical or similar and may be changed by user setting. For example, 'PIC 1,' 'PIC2,' and 'PIC 3' may all have a file format of a 'JPEG image,' or one or more may have a file format of a 'bit map image' or a 'GIF image'.

When related contents are found, the controller 130 may instruct the display unit 112 to move and display related content icon corresponding to the found related content to an area within a preset distance from the identified content icon (570). An 'icon movement' display method may be set as a method of displaying a content icon. The controller 130 may move icons 'PIC 1' and 'PIC 2' to an area within a preset distance of icon 'PIC 3.' A display gap between the identified content icon and related content icons, and a movement path of related content icons, may be changed by user setting. Further, when related content icons are moved, positions of content icons other than the identified content icon and related content icons thereof may be changed.

The touch detection unit 116 may then determine whether one of the displayed content icons is touched (580).

If one of the displayed content icons is touched, the touch detection unit 116 may detect the touch and may transmit a touch detection signal to the controller 130. When the controller 130 receives the touch detection signal from the touch detection unit 116, the controller 130 may identify the content icon at the position touched by the touch device, and may execute a content corresponding to the content icon (590). FIG. 5C illustrates a screen in which the user touches the content icon 'PIC 3', and when 'PIC 3' is touched, a content corresponding thereto may be executed.

If none of the displayed content icons is touched at step 580, the process may return to step 570.

Figure 6A:
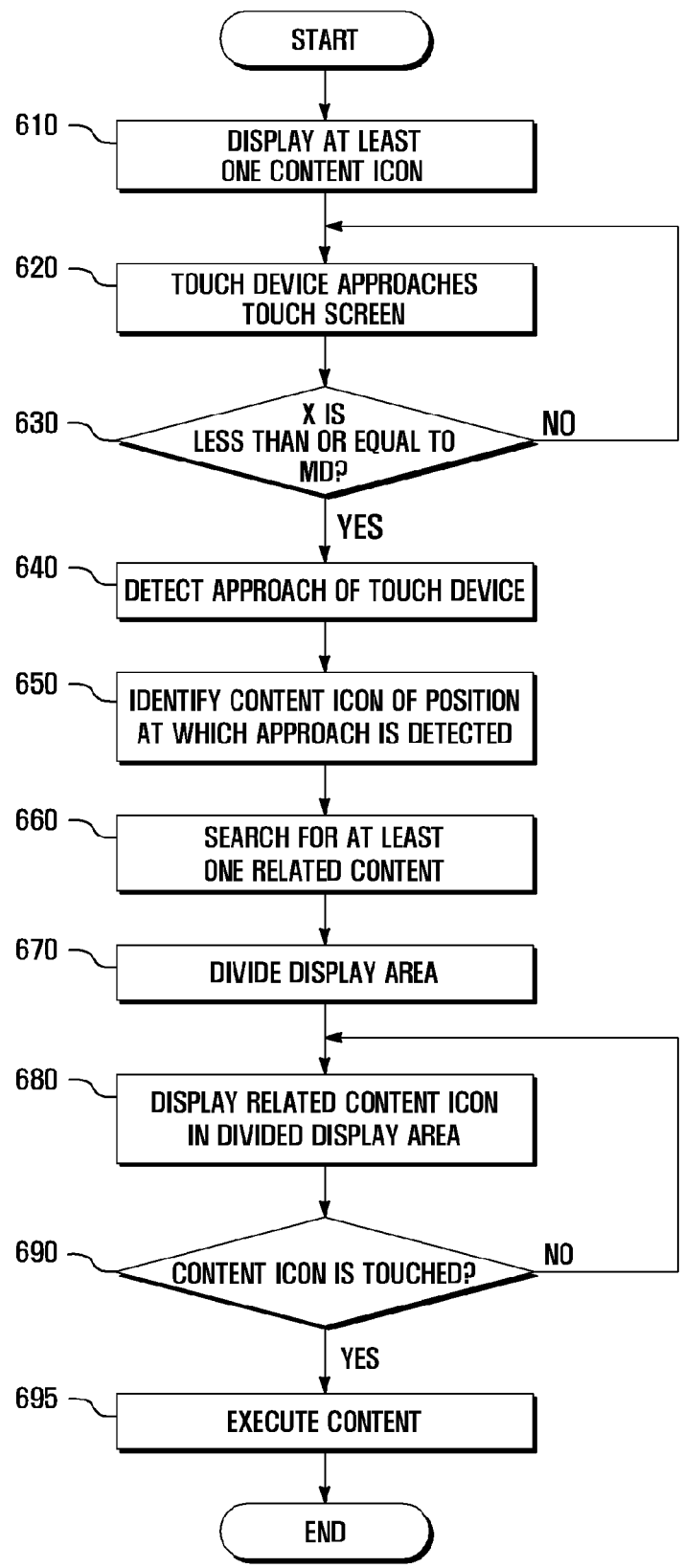
FIG. 6A is a flowchart illustrating an example of the method of searching for and executing content of FIG. 2 according to exemplary embodiments of the present invention
Figure 6B:
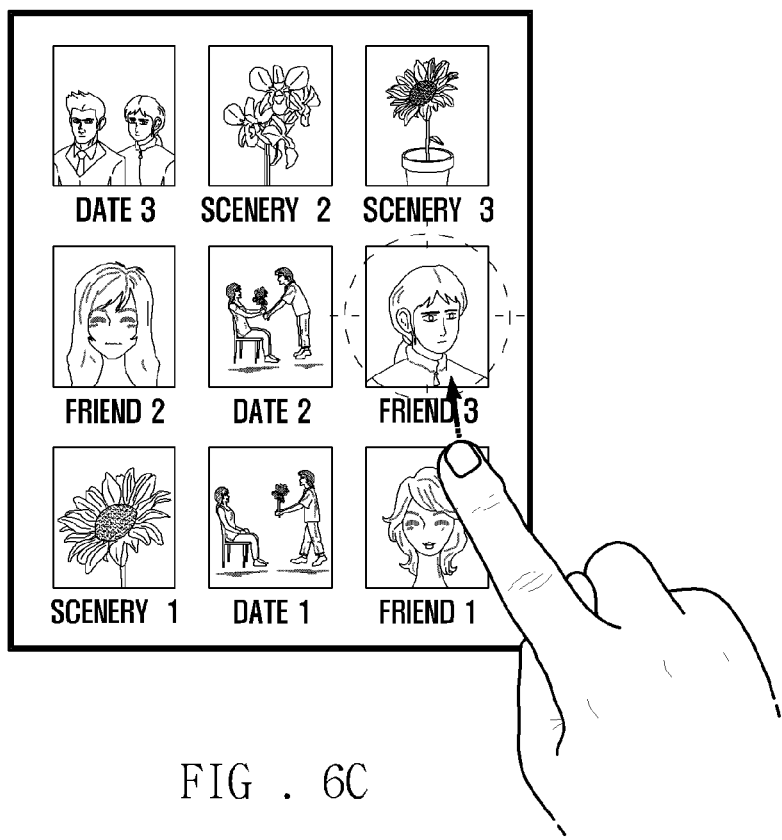
FIG. 6B, FIG. 6C, and FIG. 6D illustrate display screens according to the example of FIG. 6A, according to exemplary embodiments of the present invention.
Figure 6C:
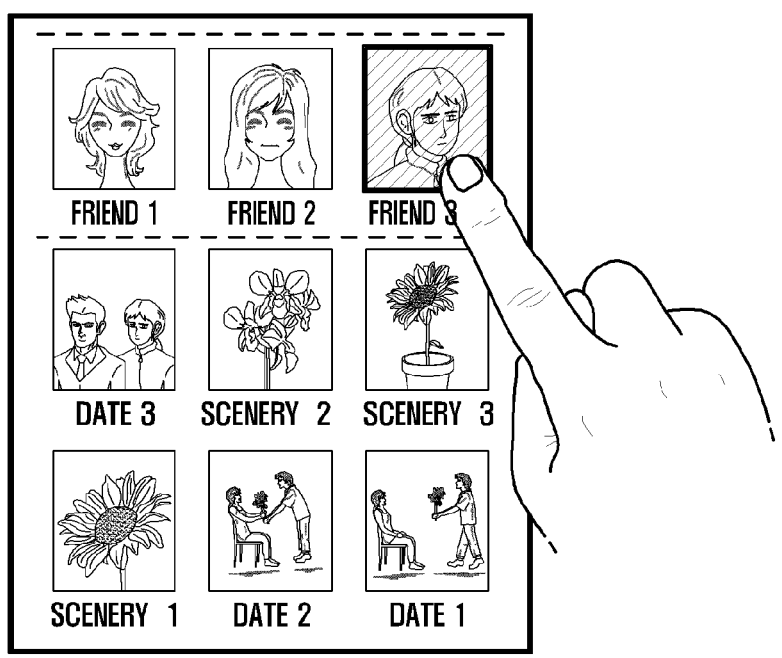
Figure 6D:
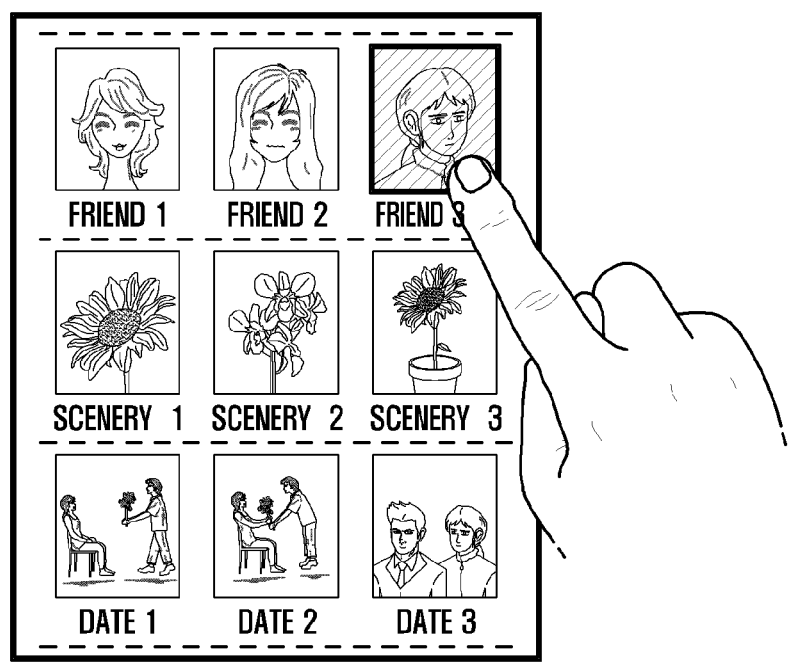

FIG. 6A is a flowchart illustrating an example of the method to search for and execute a content of FIG. 2. FIG. 6B, FIG. 6C, and FIG. 6D illustrate a display screen to search for and execute content according to the example of FIG. 6A.

Referring to FIG. 6A, the controller 130 may instruct the display unit 112 to display at least one content icon (610). The display screen shown in FIG. 6B corresponds to a background screen or a standby screen of the device 100 having the touch screen 110 and may display a folder including contents. FIG. 6B illustrates 9 picture content icons, namely 'date 1,' 'date 2,' 'date 3,' 'scenery 1,' 'scenery 2,' 'scenery 3,' 'friend 1,' 'friend 2,' and 'friend 3.'

A touch device may approach the touch screen 110 (620), and the approach action to the touch screen 110 may be performed until the touch device moves within a preset distance in a vertical direction from the touch screen 110. If the perpendicular distance from the touch screen 110 to a touch device is 'X' and the maximum distance at which the approach detection unit 114 can detect an approach is 'MD,' the approach detection unit 114 may detect an approach of the touch device when 'X' is less than or equal to 'MD' (630).

If 'X' is less than or equal to 'MD,' the approach detection unit 114 may detect an approach of the touch device to the touch screen 110 and may transmit an approach detection signal to the controller 130 (640). If 'X' is greater than 'MD,' the process returns to step 620.

When the controller 130 receives the approach detection signal from the approach detection unit 114, the controller 130 may identify a content icon at a position at which the approach is detected (650). The content icon of the position at which the approach is detected may be a content icon positioned within a preset distance from a position of the touch device. In FIG. 6B, the content icon of the position at which the approach is detected may be the picture content icon 'friend 3.'

The controller 130 may search the storage unit 120 for at least one related content classified in the same category as that of content corresponding to the identified content icon according to a preset classification reference (660). The classification reference may be set so that related content corresponds to content having a content name identical to or similar to that of the content corresponding to the identified content icon of the position at which the approach is detected. The controller 130 may identify the approached content icon 'friend 3' and may search the storage unit 120 for related content classified in the same category as that of content corresponding to 'friend 3' according to the preset classification reference. For example, the controller 130 may search for a content having a content name identical to or similar to that of 'friend 3,' namely contents corresponding to the picture content icons 'friend 1' and 'friend 2.'

When related contents are found, the controller 130 may divide a display area in which content icons are to be displayed (670). The divided display area may be set to divide content icons in a set configuration, and can be set in any suitable manner by user setting.

After the display area is divided, the controller 130 may instruct the display unit 112 to display related content icons in the divided display area (680). FIG. 6C illustrates a screen in which the content icons 'friend 1,' 'friend 2,' and 'friend 3' may be displayed together to distinguish from displayed content icons other than 'friend 1,' 'friend 2,' and 'friend 3.' Content icons 'friend 1,' 'friend 2,' and 'friend 3' may be displayed in a separate area (distinguished by a dotted line) of an upper part of the display screen, and content icons other than 'friend 1,' 'friend 2,' and 'friend 3' may be displayed in a lower part of the display screen below the content icons 'friend 1,' 'friend 2,' and 'friend 3.'

FIG. 6D illustrates a screen in which contents corresponding to content icons other than 'friend 1,' 'friend 2,' and 'friend 3' may be classified according to a preset classification reference and their corresponding content icons displayed. The classification reference may be set to classify the contents into contents having, for example, the same or similar content name. For example, corresponding content icons 'date 1,' 'date 2,' and 'date 3,' and content icons 'scenery 1,' 'scenery 2,' and 'scenery 3' may be displayed in divided display areas (distinguished by dotted lines).

The touch detection unit 116 may then determine whether one of the displayed content icons is touched (690).

If one of the displayed content icons is touched, the touch detection unit 116 may detect the touch and may transmit a touch detection signal to the controller 130. When the controller 130 receives the touch detection signal from the touch detection unit 116, the controller 130 may identify the content icon at the position touched by the touch device and may execute a content corresponding to the content icon (695). FIG. 6C and FIG. 6D illustrate a screen in which the user touches the content icon 'friend 3,' and a content corresponding thereto is executed.

If none of the displayed content icons is touched at step 690, the process may return to step 680.

Figure 7A:
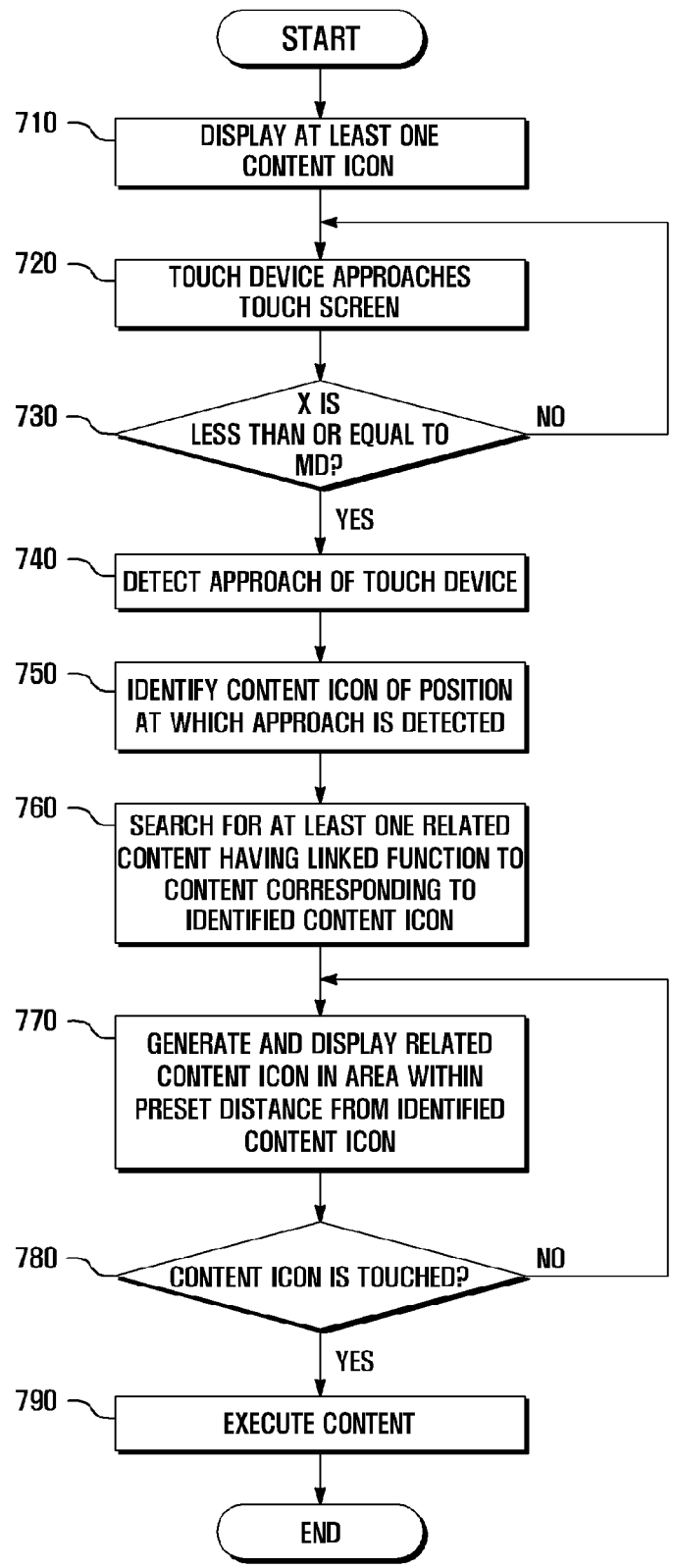
FIG. 7A is a flowchart illustrating an example of the method of searching for and executing content of FIG. 2 according to exemplary embodiments of the present invention.

FIG. 7A is a flowchart illustrating an example of the method to search for and execute a content of FIG. 2. FIG.

Figure 7B:
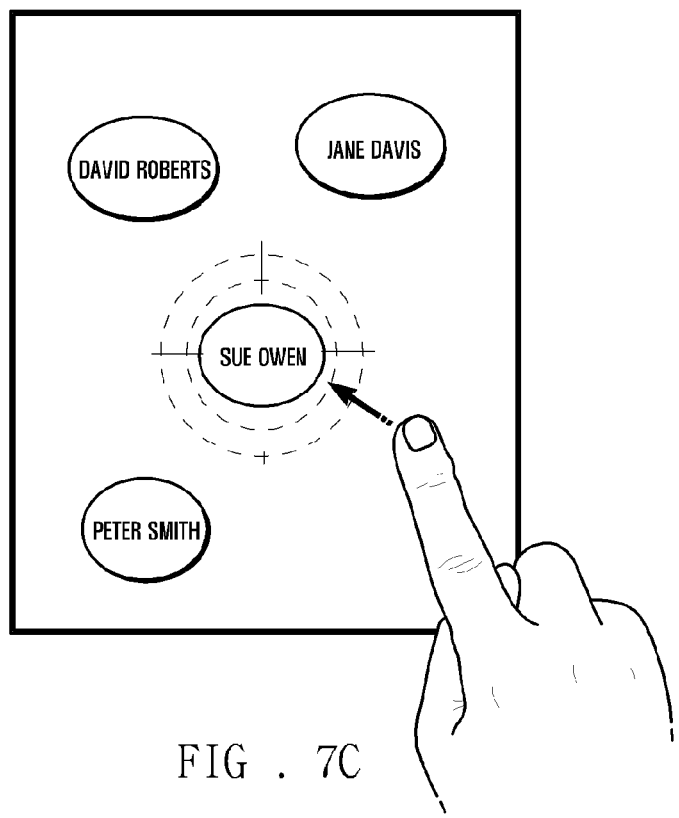
FIG. 7B and FIG. 7C illustrate display screens according to the example of FIG. 7A, according to exemplary embodiments of the present invention.
Figure 7C:
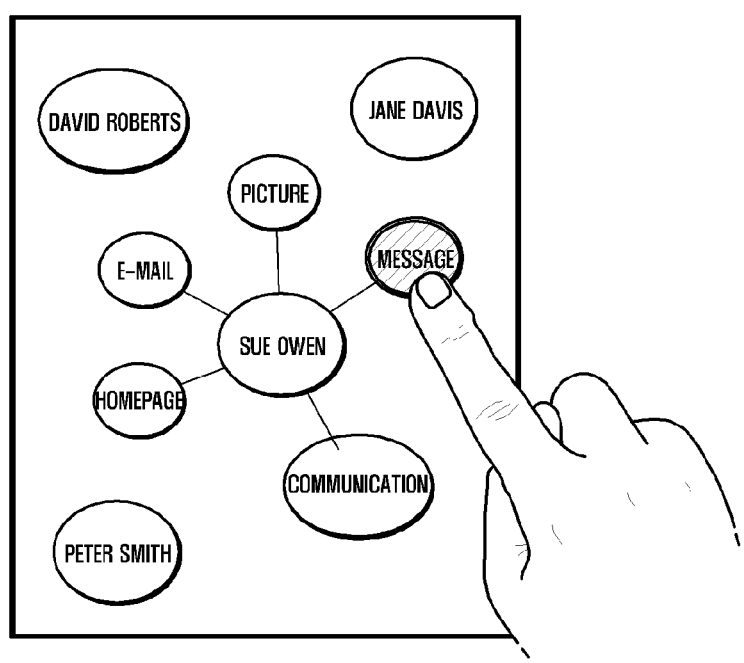

7B and FIG. 7C illustrate a display screen for searching for and executing a content according to the example of FIG. 7A.

Referring to FIG. 7A, the controller 130 may instruct the display unit 112 to display at least one content icon (710). The display screen shown in FIG. 7B corresponds to a background screen or a standby screen of the device 100 having the touch screen 110. The display screen may display a folder including contents. FIG. 7B shows 4 content icons corresponding to contents relating to personal information of persons 'Peter Smith,' 'David Roberts,' 'Jane Davis,' and 'Sue Owen.'

A touch device may approach the touch screen 110 (720). The approach action to the touch screen 110 may be performed until the touch device moves within a preset distance in a vertical direction from the touch screen 110. If the perpendicular distance from the touch screen 110 to a touch device is 'X' and the maximum distance at which the approach detection unit 114 can detect an approach is 'MD,' the approach detection unit 114 may detect an approach of the touch device when 'X' is less than or equal to 'MD' (730).

If 'X' is less than or equal to 'MD,' the approach detection unit 114 may detect an approach of the touch device to the touch screen 110 and may transmit an approach detection signal to the controller 130 (740). If 'X' is greater than 'MD,' the process may return to step 720.

When the controller 130 receives the approach detection signal from the approach detection unit 114, the controller 130 may identify a content icon at a position at which the approach is detected (750). The content icon at the position at which the approach is detected may be a content icon positioned within a preset distance from a position of the touch device. In FIG. 7B, the content icon of the position at which the approach is detected may be the content icon 'Sue Owen'.

The controller 130 may search the storage unit 120 for at least one related content having a linked function to content corresponding to the identified content icon according to a preset classification reference (760). The classification reference may be set so that related content corresponds to content having a linked function to the content corresponding to the identified content icon. The controller 130 may identify the approached content icon 'Sue Owen' and may search the storage unit 120 for related content classified in the same category as that of the content corresponding to the content icon 'Sue Owen'. The controller 130 may search for content having a linked function to content corresponding to the content icon 'Sue Owen.' The link function content may be communication function content, message transmission and reception content, e-mail transmission and reception content, picture content, or homepage link function content, and can be changed by user setting. Further, the link function content can be set on a content icon basis.

When related contents are found, the controller 130 may instruct the display unit 112 to display content icons corresponding to the found related contents (770). 'Icon generation' may be set as a method of displaying a content icon. The controller 130 may generate and display related content icons in an area within a preset distance from the content icon 'Sue Owen' in the display unit 112. The area within a preset distance can be changed by user setting. Further, a display of the related content icon and a separation distance between related content icons can be changed by user setting. For example, FIG. 7B illustrates a case where related content icons may be displayed radially about the content icon 'Sue Owen'.

The touch detection unit 116 may then determine whether one of the displayed content icons is touched (780).

If one of the displayed content icons is touched, the touch detection unit 116 may detect the touch and may transmit a touch detection signal to the controller 130.

When the controller 130 receives the touch detection signal from the touch detection unit 116, the controller 130 may identify the content icon of the position touched by the touch device and may execute a content corresponding to the content icon (790). FIG. 7C illustrates a case where the user touches an e-mail transmission and reception content icon, and when the e-mail transmission and reception content icon is touched, the user can transmit an e-mail to 'Sue Owen', or receive an e-mail transmitted from 'Peter Smith'.

If none of the displayed content icons is touched at step 780, the process may return to step 770.

As described above, content can be simply searched for and executed while reducing the quantity of a user's touch actions.

Further, by reducing the quantity of a user's touch actions, an improved content execution function can be provided to the user, and a sensitive user interface can be provided to the user by enabling continuous operation of approach and touch actions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method, comprising:
 displaying content icons on a touch screen;
 in response to detecting an approach of a touch input means to a content icon of the displayed content icons, displaying at least one related content icon corresponding to at least one related content to an area within a preset distance from the approached content icon while the approach is detected, the at least one related content icon being displayed prior to a contact of the touch input means on the touch screen; and
 in response to detecting a touch of the touch input means to one content icon of the displayed at least one related content icon and the approached content icon, executing content corresponding to the touched one content icon.

2. The method of claim 1, wherein the at least one related content comprises content having a file format identical to or similar to the content corresponding to the approached content icon.

3. The method of claim 1, wherein the at least one related content comprises content having at least one of a content name, content generation time point, and content generation source identical to or similar to a content name, content generation time point, and content generation source of the content corresponding to the approached content icon.

4. The method of claim 1, wherein the at least one related content comprises at least one of content having a linked function to the content corresponding to the approached content icon, content having a high use frequency in relation to a use frequency of the content corresponding to the approached content icon, and a most recently used content corresponding to the content corresponding to the approached content icon.

5. The method of claim 1, wherein the at least one related content icon is displayed in any direction to the area within the preset distance from the approached content icon while the approach is detected.

6. The method of claim 1, wherein a separation distance between the at least one related content icon is determined based on a setting.

7. The method comprising:
displaying content icons;
in response to detecting an approach of a touch input means to a content icon of the displayed content icons, displaying at least one related content icon corresponding to at least one related content to an area within a preset distance from the approached content icon while the approach is detected, the at least one related content icon being created in response to the approach of the touch input means; and
in response to detecting a touch of the touch input means to one content icon of the displayed at least one related content icon and the approached content icon, executing content corresponding to the touched one content icon,
wherein when the content corresponding to the approached content icon is a picture content, the at least one related content comprises at least one of content comprising a same person image as a person image provided in the picture content corresponding to the approached content icon, content comprising a same location image as a location image provided in the picture content corresponding to the approached content icon, and content generated by the same photographing means as a photographing means of the picture content corresponding to the approached content icon.

8. A device, comprising:
an approach detection unit to detect an approach of a touch input means;
a touch detection unit to detect a touch of the touch input means;
a display unit to display content icons and content corresponding to the content icons;
a storage unit to store the content icons and the content corresponding to the content icons; and
a controller to:
when an approach detection signal associated with detection of the approach of the touch input means to a content icon of the displayed content icons is received from the approach detection unit, search, in the storage unit, for at least one related content classified in a category related to content corresponding to the approached content icon;
display at least one related content icon corresponding to the at least one related content to an area within a preset distance from the approached content icon while the approach is detected, the at least one related content icon being created in response to the approach of the touch input means; and
when a touch detection signal associated with the touch of the touch input means to one content icon of the displayed at least one related content icon and the approached content icon is received from the touch detection unit, execute content corresponding to the touched one content icon.

9. The device of claim 8, wherein the at least one related content comprises content having a file format identical to or similar to the content corresponding to the approached content icon.

10. The device of claim 8, wherein the at least one related content comprises content having at least one of a content name, content generation time point, and content generation source identical to or similar to a content name, content generation time point, and content generation source of the content corresponding to the approached content icon.

11. The device of claim 8, wherein the at least one related content comprises at least one of content having a linked function to the content corresponding to the approached content icon, content having a high use frequency in relation to a use frequency of the content corresponding to the approached content icon, and a most recently used content corresponding to the content corresponding to the approached content icon.

12. The device of claim 8, wherein when the content corresponding to the approached content icon is a picture content, the at least one related content comprises at least one of content comprising a same person image as a person image provided in the picture content corresponding to the approached content icon, content comprising a same location image as a location image provided in the picture content corresponding to the approached content icon, and content generated by the same photographing means as a photographing means of the picture content corresponding to the approached content icon.

13. The device of claim 8, wherein the at least one related content icon is displayed in any direction to the area within the preset distance from the approached content icon while the approach is detected.

14. The device of claim 8, wherein a separation distance between the at least one related content icon is determined based on a setting.

* * * * *